(12) United States Patent
Yamada et al.

(10) Patent No.: US 10,619,731 B2
(45) Date of Patent: *Apr. 14, 2020

(54) LOCK-UP CONTROL DEVICE FOR VEHICLE

(71) Applicants: JATCO Ltd, Fuji-shi, Shizuoka (JP); NISSAN MOTOR CO., LTD., Yokohama-shi, Kanagawa (JP)

(72) Inventors: Takahiro Yamada, Ebina (JP); Kunihiro Takahashi, Atsugi (JP); Syunsuke Iwamoto, Isehara (JP); Yuji Okamoto, Atsugi (JP); Toshiaki Noda, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/073,127

(22) PCT Filed: Jan. 31, 2017

(86) PCT No.: PCT/JP2017/003263
§ 371 (c)(1),
(2) Date: Jul. 26, 2018

(87) PCT Pub. No.: WO2017/135204
PCT Pub. Date: Aug. 10, 2017

(65) Prior Publication Data
US 2019/0040950 A1 Feb. 7, 2019

(30) Foreign Application Priority Data
Feb. 1, 2016 (JP) .................. 2016-017069

(51) Int. Cl.
F16H 61/14 (2006.01)
F16H 59/46 (2006.01)
B60W 10/02 (2006.01)

(52) U.S. Cl.
CPC ........... *F16H 61/143* (2013.01); *F16H 61/14* (2013.01); *B60W 10/023* (2013.01);
(Continued)

(58) Field of Classification Search
CPC .. F16H 61/14; F16H 61/143; F16H 2061/145; F16H 2059/467; B60W 10/026;
(Continued)

(56) References Cited

U.S. PATENT DOCUMENTS 5,417,621 A 5/1995 Tibbles
7,195,581 B2 3/2007 Segawa et al.
(Continued)

FOREIGN PATENT DOCUMENTS

JP 2005-133781 A 5/2005
JP 2005-133782 A 5/2005
(Continued)

OTHER PUBLICATIONS

Non-Final Office Action on U.S. Appl. No. 16/073,235 dated Dec. 13, 2019.

*Primary Examiner* — Edwin A Young
(74) *Attorney, Agent, or Firm* — Foley & Lardner LLP

(57) ABSTRACT

A lockup control device for a vehicle includes: a torque converter; a lockup control section configured to increase a lockup pressure difference command to an initial pressure difference when a lockup engagement condition is satisfied in a disengagement state of the lockup clutch, and then to increase the lockup pressure difference command by a ramp pressure difference by a predetermined gradient, the lockup control section being configured to determine a ramp start (Continued)

condition by which the lockup pressure difference command is switched from the initial pressure difference to the ramp pressure difference, based on a speed ratio which is a ratio of input and output rotation speeds of the torque converter.

3 Claims, 10 Drawing Sheets

(52) U.S. Cl.
CPC ....... *B60W 10/026* (2013.01); *B60W 2540/10* (2013.01); *B60W 2710/025* (2013.01); *F16H 2059/467* (2013.01); *F16H 2061/145* (2013.01)

(58) Field of Classification Search
CPC ............ B60W 10/06; B60W 2540/10; B60W 2710/024; B60W 2710/025
See application file for complete search history.

(56) References Cited

U.S. PATENT DOCUMENTS

| | | | |
|---|---|---|---|
| 7,220,216 B2 | 5/2007 | Ohta | |
| 7,699,748 B2 | 4/2010 | Kawamura et al. | |
| 8,771,147 B2 | 7/2014 | Yamada et al. | |
| 9,057,435 B2 | 6/2015 | Kawaguchi et al. | |
| 9,815,466 B2 | 11/2017 | Tohta | |
| 2003/0060330 A1* | 3/2003 | Sato | F16H 61/143 477/174 |
| 2005/0096182 A1 | 5/2005 | Ohta | |
| 2007/0142173 A1* | 6/2007 | Kawamura | F16H 61/0021 477/156 |
| 2008/0023285 A1* | 1/2008 | Tsunekawa | F16H 61/143 192/3.3 |
| 2012/0142494 A1 | 6/2012 | Yamada et al. | |
| 2015/0046051 A1 | 2/2015 | Kawaguchi et al. | |
| 2017/0120918 A1 | 5/2017 | Tohta | |
| 2019/0032778 A1* | 1/2019 | Yamada | F16H 61/14 |
| 2019/0040950 A1 | 2/2019 | Yamada et al. | |

FOREIGN PATENT DOCUMENTS

| | | |
|---|---|---|
| JP | 2009-180361 A | 8/2009 |
| JP | 2010-286040 A | 12/2010 |
| JP | 2012-117624 A | 6/2012 |

* cited by examiner

VEHICLE START

REACCELERATION

LOCK-UP CONTROL DEVICE FOR VEHICLE

TECHNICAL FIELD

This invention relates to a lockup control device for a vehicle which is configured to perform a slip engagement control of a lockup clutch in a traveling scene at a shift from a lockup disengagement state to a lockup engagement state.

BACKGROUND ART

There is known a device in a vehicle including a torque converter having a lockup clutch between an engine and a transmission. The device is configured to presume a contact timing at which the lockup clutch has a lockup capacity, based on a variation of an engine speed (for example, a patent document 1).

However, in this conventional device, the contact timing is presumed based on the variation of the engine speed. Accordingly, the contact timing may be erroneously presumed in a drive state by an accelerator depression. When a ramp control to engage the lockup clutch is started based on the contact timing which is deviated from an appropriate timing at which the lockup clutch starts to have a lockup capacity (the lock capacity is started to be generated), a vehicle behavior variation is generated due to a forward/rearward G variation.

That is, in an accelerator foot release coast state, there is no variation of a turbine rotation speed, or there is small variation of the turbine rotation speed. Accordingly, it is possible to presume the contact timing by the variation of the engine speed. However, for example, when the reacceleration is performed by the accelerator depression from a coast deceleration traveling, the engine speed and the turbine rotation speed are varied due to the drive state. Accordingly, the contact timing may be erroneously presumed by monitoring the only variation of the engine speed.

PRIOR ART DOCUMENT

Patent Document

Japanese Patent Application Publication No. 2005-133781

SUMMARY OF THE INVENTION

It is, therefore, an object of the present invention to provide a lockup control device for a vehicle which is devised to solve the above-mentioned problems, and to decrease a vehicle behavior variation due to an engagement of a lockup clutch in a traveling scene at a shift from a disengagement state of the lockup clutch to an engagement state of the lockup clutch.

To attain the above-described object, in the present invention, a lockup control device for a vehicle comprises:

a torque converter which is disposed between a driving source and a transmission, and which includes a lockup clutch, and a lockup control means configured to increase a lockup pressure difference command to an initial pressure difference when a lockup engagement condition is satisfied in a disengagement state of the lockup clutch, and then to increase the lockup pressure difference command by a ramp pressure difference by a predetermined gradient, the lockup control means being configured to determine a ramp start condition by which the lockup pressure difference command is switched from the initial pressure difference to the ramp pressure difference, based on a speed ratio which is a ratio of input and output rotation speeds of the torque converter.

Accordingly, the ramp start timing at which the lockup pressure difference command is shifted from the initial pressure difference to the ramp pressure difference is determined based on a speed ratio which is a ratio of the input and output rotation speeds of the torque converter. That is, the speed ratio of the torque converter is represented by a formula of (the speed ratio=the turbine rotation speed/the driving source rotation speed). Accordingly, the speed ratio of the torque converter is an index value reflecting the variation of the turbine rotation speed and the variation of the driving source rotation speed. In addition, when the speed ratio of the torque converter is shifted from the speed ratio in the disengagement state of the lockup clutch to the speed ratio at which the lockup clutch starts to have the lockup capacity, the speed ratio is varied by the suppression of the increase of the driving source rotation speed.

Accordingly, it is possible to sense an appropriate ramp start timing at which the lockup clutch starts to have the lockup capacity, by monitoring the variation of the speed ratio of the torque converter.

DESCRIPTION OF EMBODIMENTS

An embodiment to attain a lockup control device for a vehicle according to the present invention is explained with reference to a first embodiment shown in drawings.

First Embodiment

Firstly, a configuration is explained.

A lockup control device according to the first embodiment is applied to an engine vehicle including a torque converter and a continuously variable transmission (CVT). Hereinafter, a configuration of the lockup control device for the engine vehicle according to the first embodiment is explained about "Overall System Configuration", and "Lockup Control Process Configuration".

[Overall System Configuration]

Figure 1:
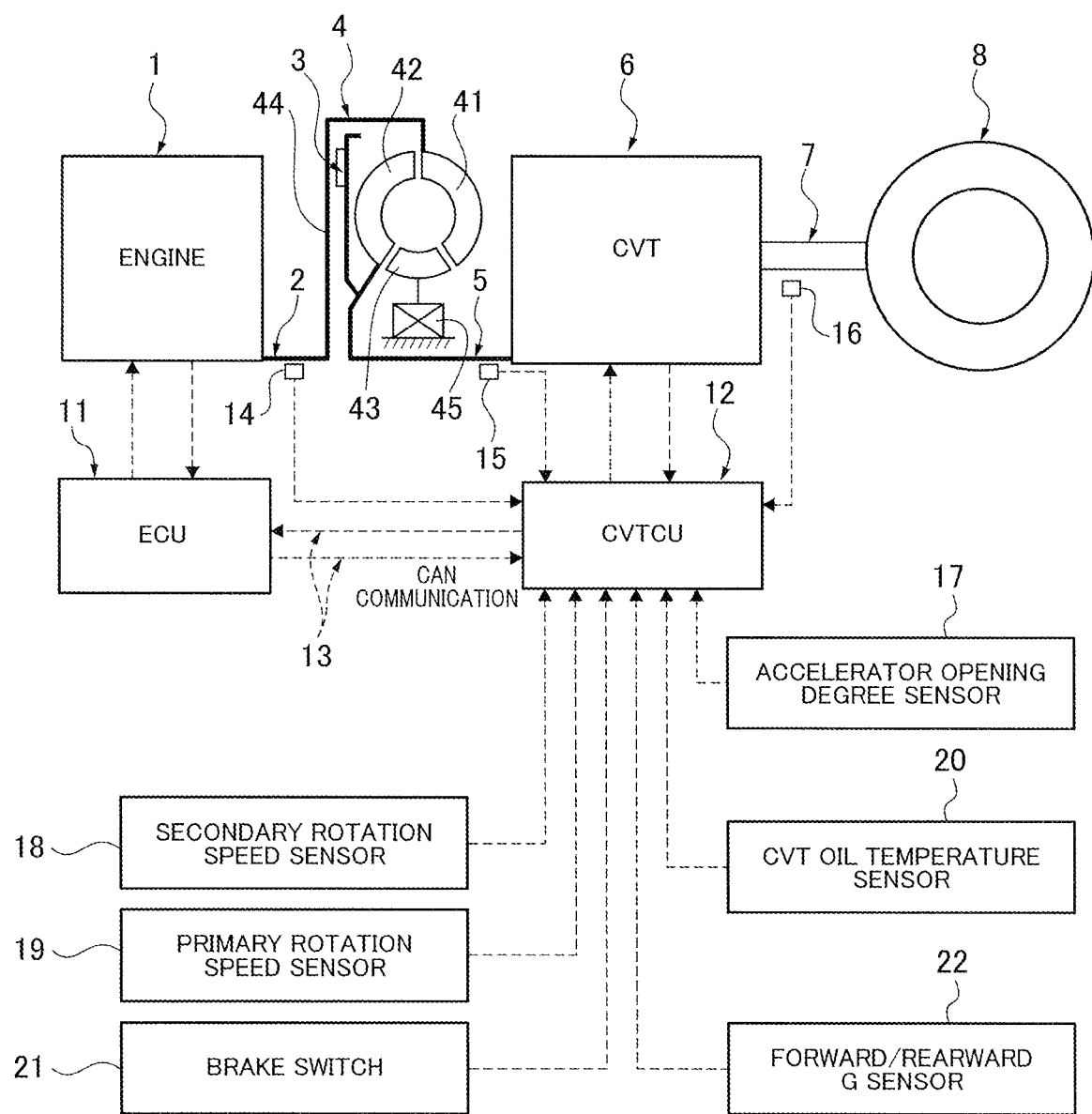
FIG. 1 is an overall system diagram showing an overall system configuration of an engine vehicle to which a lockup control device according to a first embodiment is applied.
Figure 2:
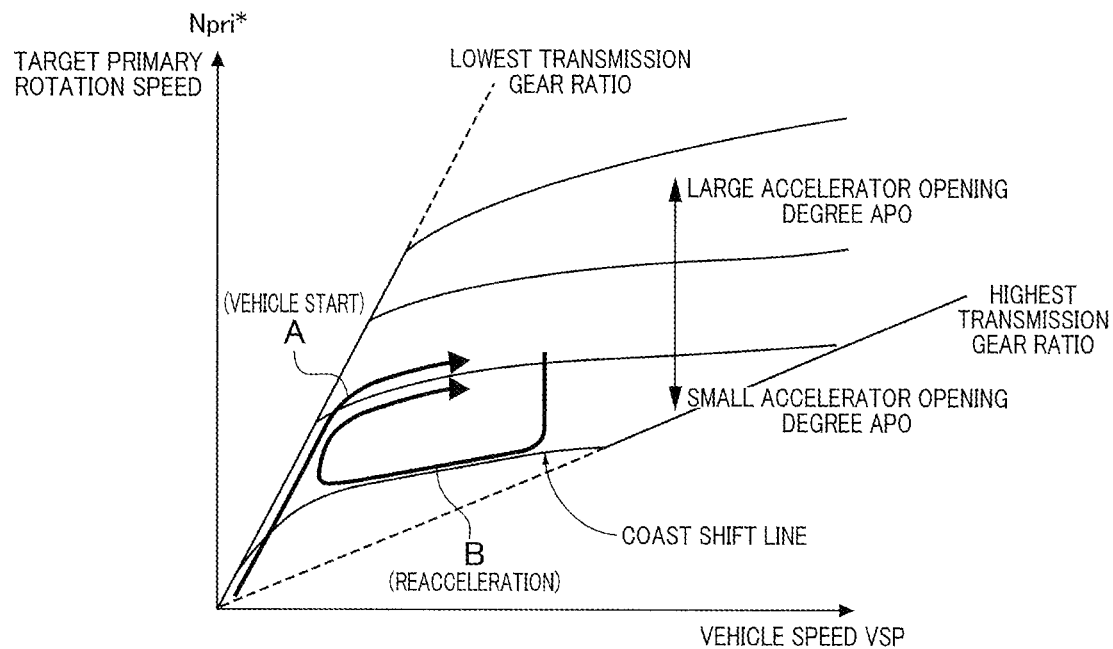
FIG. 2 is a normal shift schedule showing one example of a normal shift line determining a target primary rotation speed of a continuously variable transmission.
Figure 3:
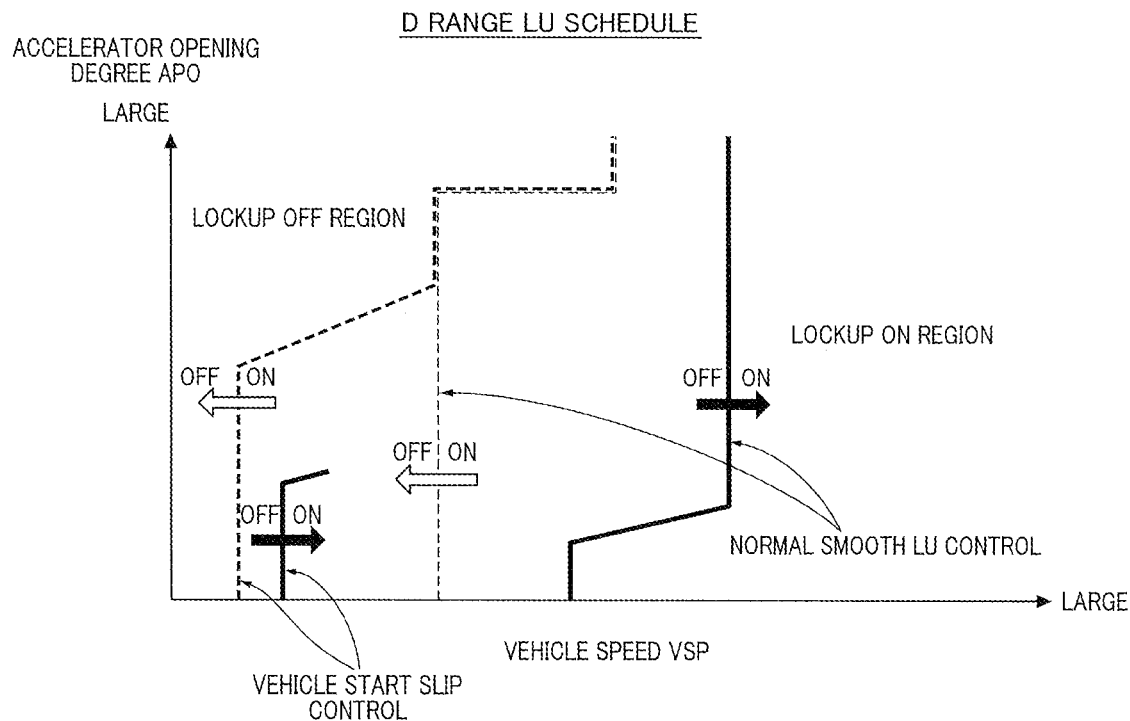
FIG. 3 is a D range LU schedule showing one example of LU engagement vehicle speed lines and LU disengagement vehicle speed lines of a lockup clutch at a vehicle start slip control and at a normal smooth lockup control.

FIG. 1 is an overall system configuration of the engine vehicle to which the lockup control device according to the first embodiment is applied. FIG. 2 shows a normal shift schedule of the continuously variable transmission. FIG. 3 shows a D range LU schedule. Hereinafter, the overall system configuration is explained with reference to FIG. 1 to FIG. 3.

As shown in FIG. 1, a vehicle drive system includes an engine 1, an engine output shaft 2, a lockup clutch 3, a torque converter 4, a transmission input shaft 5, a continuously variable transmission 6, a drive shaft 7, and a drive wheel 8.

The lockup clutch 3 is installed in the torque converter 4. The lockup clutch 3 is arranged to connect the engine 1 and the continuously variable transmission 6 through the torque converter 4 by a clutch disengagement, and to directly connect the engine output shaft 2 and the transmission input shaft 5 by a clutch engagement. When a CVT control unit 12 described later outputs a lockup pressure difference command (hereinafter, referred to as LU pressure difference command), the engagement/the slip engagement/the disengagement of the lockup clutch 3 is controlled by a lockup hydraulic pressure regulated based on a line pressure which is a source pressure. Besides, the line pressure is formed by regulating a discharge pressure from an oil pump (not shown) rotated by the engine 1 by a line pressure solenoid valve.

The torque converter 4 includes a pump impeller 41; a turbine runner 42 disposed to confront the pump impeller 41; and a stator 43 disposed between the pump impeller 41 and the turbine runner 42. This torque converter 4 is a fluid coupling arranged to circulate the hydraulic fluid filled in the torque converter 4 on blades of the pump impeller 41 and the turbine runner 42, and thereby to transmit the torque. The pump impeller 41 includes an inner surface connected to an engine output shaft 2 through a converter cover 44 which is an engagement surface of the lockup clutch 3. The turbine runner 42 is connected to a transmission input shaft 5. The stator 43 is provided to a stationary member (transmission case and so on) through one-way clutch 45.

The continuously variable transmission 6 is a belt type continuously variable transmission arranged to vary belt contact radii of a primary pulley and a secondary pulley, and thereby to continuously control a transmission gear ratio. An output rotation after the shift in the continuously variable transmission 6 is transmitted through a drive shaft 7 to a driving wheel 8.

As shown in FIG. 1, a vehicle control system includes an engine control unit 1 (ECU); a CVT control unit 2 (CVTCU); and a CAN communication line 13. The vehicle control system includes an engine speed sensor 14, a turbine rotation speed sensor 15 (=CVT input rotation speed sensor), and a CVT output rotation speed sensor 16 (=vehicle speed sensor) which are sensors for obtaining input information. Moreover, the vehicle control system includes an accelerator opening degree sensor 17, a secondary rotation speed sensor 18, a primary rotation speed sensor 19, a CVT oil temperature sensor 20, a brake switch 21, a forward/rearward G sensor 22, and so on.

The engine control unit 11 is configured to decrease the fuel injection amount to the engine 1 to obtain the torque down (decrease) value based on the accelerator opening degree APO when the engine control unit 1 receives the torque down (decrease) signal to request the start of the engine torque down (decrease) control, from the CVT control unit 12 through the CAN communication line 13. Then, the engine control unit 11 is configured to return to a combustion injection control to obtain a normal torque according to the driver's request when the torque down signal received from the CVT control unit 12 through the CAN communication line 13 is stopped during the engine torque down control.

The CVT control unit 12 is configured to perform a shift control to control the transmission gear ratio of the continuously variable transmission 6; a line pressure control; a lockup control to control the engagement/slip engagement/disengagement of the lockup clutch 3, and so on.

A normal shift control to continuously control and vary the transmission gear ratio is performed as the shift control of the continuously variable transmission 6, by a feedback control so that the primary rotation speed Npri of the continuously variable transmission 6 corresponds to a target primary rotation speed Npri* of the continuously variable transmission 6 which is calculated by a normal shift line.

"The normal shift line" is shift lines at the respective accelerator opening degrees for determining the target primary rotation speed Npri* based on the driving point (VSP, APO) by the vehicle speed VSP and the accelerator opening degree APO, as shown in a normal shift schedule of FIG. 2. In these normal shift lines, a shift line in an accelerator foot release coast state (the accelerator opening degree APO=0/8) is a coast shift line.

At a timing of the vehicle start from the vehicle stop, the driving point (VSP, APO) is moved along a lowest transmission gear ratio line by the accelerator depression operation, as shown by an arrow A of FIG. 2. When the accelerator opening degree APO reaches the accelerator opening degree APO after the depression, an upshift to increase the vehicle speed VSP is performed.

At a timing of the coast deceleration from the drive traveling, the driving point (VSP, APO) is decreased to the coast shift line by the accelerator foot release operation, as shown by an arrow B of FIG. 2. Then, the driving point (VSP, APO) is moved along the coast shift line. A downshift to decrease the vehicle speed VSP is performed. When the reacceleration is intended during this coast deceleration by the accelerator depression operation, the driving point (VSP, APO) is moved in a direction to increase the accelerator opening degree APO, as shown by an arrow B of FIG. 2. When the accelerator opening degree APO reaches the accelerator opening degree APO after the depression, the upshift to increase the vehicle speed VSP is performed.

A slip lockup control of the lockup clutch 3 includes "a vehicle start slip control" performed at the vehicle start, and "a normal smooth LU control" performed at the reacceleration and so on which are other than the vehicle start. In "the vehicle start slip control", the slip engagement/the disengagement control is performed in accordance with an LU start vehicle speed line (OFF→ON) set in the low vehicle speed region immediately after the vehicle start, and an LU release vehicle speed line (ON→OFF) set in the vehicle speed higher than the LU start vehicle speed line, as shown by the D range LU schedule of FIG. 3. In "the normal smooth LU control", the slip engagement/the disengagement control is performed in accordance with an LU start vehicle speed line (OFF→ON) set in a speed region higher than the vehicle start slip control, and an LU release vehicle speed line (ON→OFF) set in the vehicle speed lower than the LU start vehicle speed line, as shown by a D range LU schedule of FIG. 3. That is, when the driving point (VSP, APO) existing in the lockup OFF region is moved across the LU start vehicle speed line, the slip engagement control of the lockup clutch 3 is started based on the output of the clutch engagement command. The driving point enters the lockup ON region. On the other hand, when the driving point (VSP, APO) existing in the lockup ON region is moved across the LU release vehicle speed line, the disengagement control of the lockup clutch 3 is started based on the output of the clutch disengagement command. The driving point enters the lockup OFF region.

[Lockup Control Process Configuration]

Figure 4:
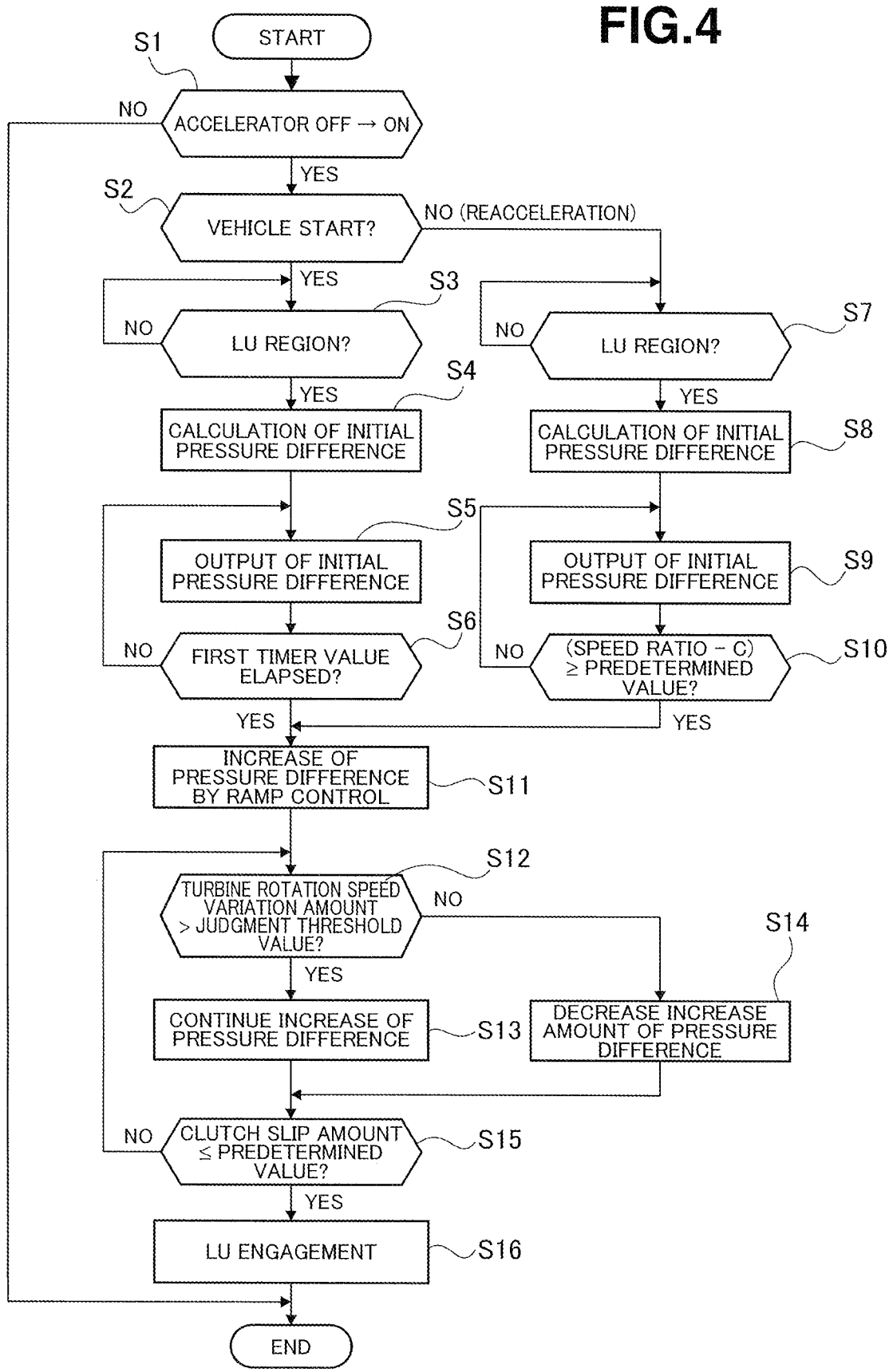
FIG. 4 is a flowchart showing a flow of the lockup control operation which is performed in a CVT control unit according to the first embodiment, and in which the lockup clutch is engaged at a shift from a coast state to a drive state by an accelerator depression.

FIG. 4 shows a flow of the lockup control process which is performed in the CVT control unit 12 of the first embodiment, and by which the lockup clutch is slip-engaged when the vehicle is shifted from the coast state to the drive state by the accelerator depression. Hereinafter, steps of FIG. 4 which represent the lockup control process configuration are explained. Besides, this process is started when a lockup OFF condition in which the lockup clutch 3 is disengaged, and an accelerator OFF condition in which the vehicle is in the accelerator foot release state are satisfied. Moreover, an "LU" is abbreviation of the "lockup clutch".

At step S1, it is judged whether or not the accelerator depression operation is performed with the intention of the vehicle start or the reacceleration. In case of YES (the accelerator OFF→ON), the process proceeds to step S2. In case of NO (other than the accelerator OFF→ON), the process proceeds to an end.

In this case, it is judged that the accelerator depression operation is performed, for example, when the accelerator opening degree APO from the accelerator opening degree sensor 17 is shifted from the 0/8 opening degree (the accelerator foot release state) to the opening degree higher than the 0/8 opening degree. Moreover, in a case where the accelerator switch is used, it is judged that the accelerator depression operation is performed when the switch signal is switched from the OFF state (the accelerator foot release state) to the ON state (the accelerator depression state).

Subsequently to the judgment of the accelerator OFF→ON at step S1, it is judged whether or not the vehicle is in the vehicle start state based on the vehicle speed VSP at the accelerator depression operation, at step S2. In case of YES (the vehicle start), the process proceeds to step S3. In case of NO (the reacceleration), the process proceeds to step S7.

That is, when the vehicle speed VSP at the accelerator depression operation satisfies the VSP≤a vehicle stop judgment value, it is judged that the vehicle is in the vehicle start state. On the other hand, when the vehicle speed VSP at the accelerator depression operation satisfies the VSP>the vehicle stop judgment value, it is judged that the vehicle is in the reacceleration state.

Subsequently to the judgment of the vehicle start state at step S2, or the judgment in which the driving point (VSP, APO) does not exist in the LU region at the vehicle start at step S3, it is judged whether or not the driving point (VSP, APO) at that time exist in the LU region at the vehicle start, at step S3. In case of YES (in the LU region), the process proceeds to step S4. In case of NO (out of LU region), the process repeats the judgment of step S3.

In this case, it is judged whether or not the driving point (VSP, APO) exist in the LU region at the vehicle start by using the LU start vehicle speed line in "the vehicle start slip control" of the D range LU schedule shown in FIG. 3. That is, it is judged that the driving point (VSP, APO) is out of the LU region until the driving point (VSP, APO) becomes the vehicle speed VSP across the LU start vehicle speed line. It is judged that the driving point (VSP, APO) is in the LU region when the driving point (VSP, APO) becomes the vehicle speed VSP across the LU start vehicle speed line.

Subsequently to the judgment in which the driving point (VSP, APO) is in the LU region at step S3, an initial pressure difference (=0 point pressure difference+pressure difference α) at the vehicle start is calculated at step S4. The process proceeds to step S5.

Figure 5:
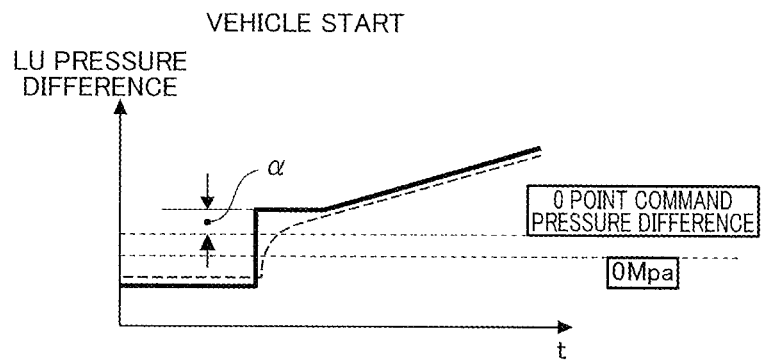
FIG. 5 is a view showing an initial pressure difference of an LU pressure difference command in the lockup control at the vehicle start.
Figure 7:
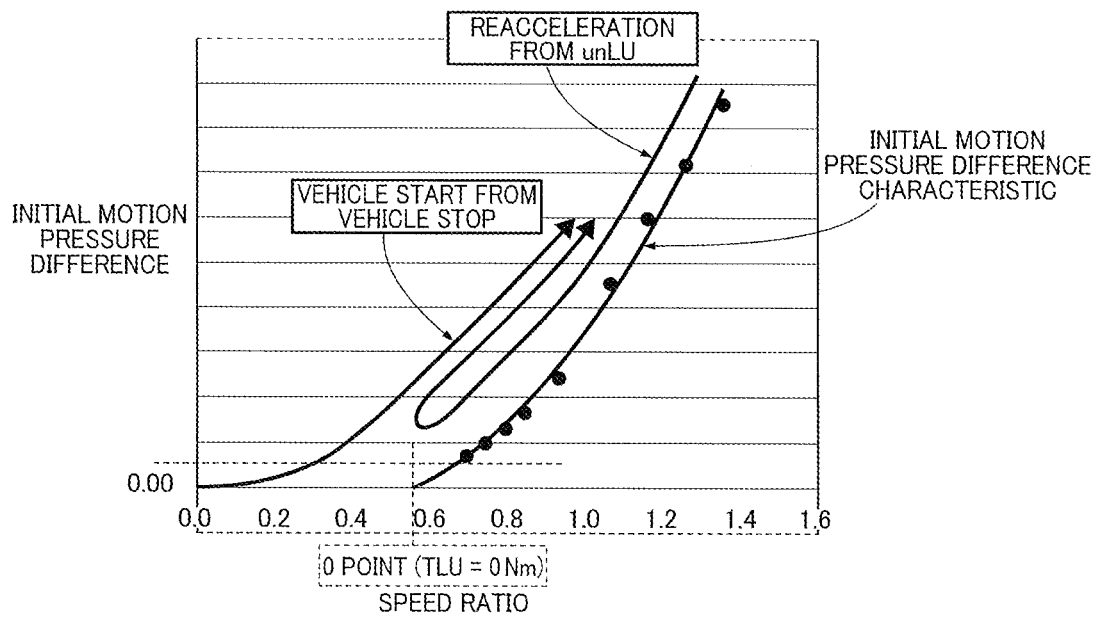
FIG. 7 is a characteristic comparing view showing an initial motion pressure difference characteristic with respect to the speed ratio of the torque converter, a speed ratio variation characteristic at the vehicle start from the vehicle stop, and a speed ratio variation characteristic at the reacceleration from the unlockup.

In this case, "the initial pressure difference at the vehicle start" is a value obtained by adding a pressure difference α obtained in consideration of the initial motion pressure difference from (after) the converter state of the torque converter 4, to the 0 point pressure difference based on a meet point learning value at which the lockup capacity is started to be generated, as shown in FIG. 5. "The 0 point pressure difference" is the pressure difference which is based the meet point learning value, and which is immediately before the timing at which the LU capacity is started to be generated. "The 0 point pressure difference" can be calculated by subtracting an offset amount from the meet point learning value. "The initial motion pressure difference" is the pressure difference by which the lockup clutch 3 is started to be moved in the engagement direction (the clutch grasping direction) to have the LU capacity. "The initial motion pressure difference" is obtained by using a speed ratio of the torque converter 4, and an initial motion pressure difference characteristic shown in FIG. 7. Besides, in a speed ratio region in which the speed ratio is higher than 0.6, a return force of the lockup clutch 3 is greater as shown in FIG. 7. Accordingly, the pressure difference α needs to be large for grasping the lockup clutch 3. Besides, "the initial pressure difference at the vehicle start" is set by (the 0 point pressure difference+pressure difference α) so that it is possible to perform the initial grasping of the lockup clutch 3, as shown in FIG. 5. Besides, "the pressure difference α" may be calculated by adding a value obtained in consideration of a learning error amount of the "0 point pressure difference", to the initial motion pressure difference.

Subsequently to the initial pressure difference is calculation at the vehicle start at step S4, or the judgment of T<T1 at step S6, the LU pressure difference command by the initial pressure difference of the vehicle start which is calculated at step S4 is outputted at step S5. The process proceeds to step S6.

In this case, the output of the LU pressure difference command is maintained to the initial pressure difference at the vehicle start until the time wait time condition by a timer at step S6 is satisfied.

Subsequently to the LU pressure difference command output by the initial pressure difference at step S5, it is judged whether or not a timer value T started from the output of the LU pressure difference command by the initial pressure difference is equal to or greater than a first timer value T1, at step S6. In case of YES (T≥T1), the process proceeds to step S11. In case of NO (T<T1), the process returns to step S5.

In this case, "the first timer value T1" is set to a response delay time period necessary for the increase of the LU actual pressure difference to the pressure difference by which it is possible to perform the initial motion of the lockup clutch 3, from the output of the LU pressure difference command by the initial pressure difference. This "first timer value T1" is obtained based on many experimental results relating to the response delay time period. Besides, the "first timer value T1" may be a fixed value. For example, the "first timer value T1" may be a variable value by a CVT oil temperature, an accelerator depression speed, and so on.

Subsequently to the judgment of the reacceleration at step S2, or the judgment in which the driving point (VSP, APO) does not exist in the LU region at the reacceleration at step S7, it is judged whether or not the driving point (VSP, APO) exists in the LU region at the reacceleration at step S7. In case of YES (in the LU region), the process proceeds to step S8. In case of NO (out of the LU region), the process repeats the judgment of step S7.

In this case, it is judged whether or not the driving point (VSP, APO) exists in the LU region at the reacceleration, by using the LU start vehicle speed line in "the normal smooth LU control" of the D range LU schedule shown in FIG. 3. That is, when the driving point (VSP, APO) is equal to or smaller than the vehicle speed VSP across the LU start vehicle speed line, it is judged that the driving point (VSP, APO) is out of the LU region until the driving point (VSP, APO) becomes the vehicle speed VSP across the LU start vehicle speed line. However, when the driving point (VSP, APO) becomes the vehicle speed VSP across the LU start vehicle speed line, or when the driving point (VSP, APO) already exists in the lockup ON region at the timing of the judgment by the operation of the lockup prohibition in the coast state, it is judged that the driving point (VSP, APO) exists in the LU region.

Subsequently to the judgment in which the driving point (VSP, APO) exists in the LU region at step S7, the initial pressure difference (=the 0 point pressure difference+the pressure difference β) at the reacceleration is calculated at step S8. The process proceeds to step S9.

Figure 6:
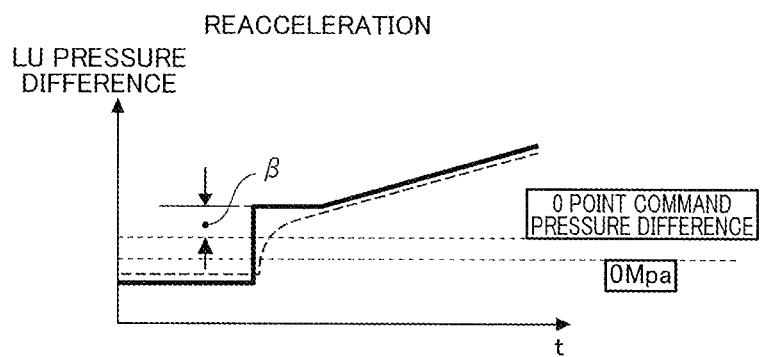
FIG. 6 is a view showing an initial pressure difference of an LU pressure difference command in the lockup control at the reacceleration.

In this case, "the initial pressure difference at the reacceleration" is a value obtained by adding the pressure difference β for preventing the increase (racing, blow-up) of the engine speed from (after) the converter state of the torque converter 4, to the 0 point pressure difference based on the meet point learning value at which the lockup capacity is started to be generated, as shown in FIG. 6. "The 0 point pressure difference" is the pressure difference which is based the meet point learning value, and which is immediately before the timing at which the LU capacity is started to be generated. "The 0 point pressure difference" can be calculated by subtracting the offset amount from the meet point learning value. "The pressure difference β for preventing the increase (racing) of the engine rotation" is the pressure difference (>the initial motion pressure difference) to ensure the clutch transmission torque $T_{LU}$ necessary for suppressing the increase (racing) of the engine speed. That is, "the initial pressure difference" is set by (the 0 point pressure difference+the pressure difference β) so as to suppress the increase (racing) of the engine speed by the clutch transmission torque $T_{LU}$ of the lockup clutch 3.

Subsequently to the initial pressure difference calculation at the reacceleration at step S8, or the judgment of [the speed ratio−C]<a predetermined value at step S10, the LU pressure difference command by the initial pressure difference at the reacceleration which is calculated at step S8 is outputted at step S9. The process proceeds to step S10.

In this case, the output of the LU pressure difference command is maintained to the initial pressure difference at the reacceleration until a speed ratio condition at step S10 are satisfied.

Subsequently to the LU pressure difference command output by the initial pressure difference at step S9, it is judged whether or not [the speed ratio−C] is equal to or greater than the predetermined value at step S10. In case of YES ([the speed ratio−C]≥the predetermined value), the process proceeds to step S11. In case of NO ([the speed ratio−C]<the predetermined value), the process returns to step S9.

In this case, "the speed ratio" is a ratio between the turbine rotation speed Nt of the torque converter 4, and the pump rotation speed (=the engine speed Ne). "The speed ratio" is calculated by using a formula of the speed ratio e=the turbine rotation speed Nt/the engine speed Ne. The turbine rotation speed Nt is obtained from the turbine rotation speed sensor 15. The engine rotation speed Ne is obtained from the engine speed rotation sensor 14. "C" is the speed ratio by C=min (the speed ratio e(n) at this time, the speed ratio e(n−1) at the previous time). "The predetermined value" is set to a small value near 0. That is, [the speed ratio−C] represents the speed variation of the speed ratio e toward the decrease side. [The speed ratio−C]≥the predetermined value represents the stop of the variation of the speed ratio e toward the decrease side. That is, [the speed ratio−C]≥the predetermined value represents a detection of an inflection point of the speed ratio at which the speed ratio e of the torque converter 4 is shifted from a decrease state to an increase state, as shown in the speed ratio variation characteristics at the reacceleration from the unlockup (unLU) of FIG. 7.

Subsequently to the judgment of T≥T1 at step S6, or the judgment of [the speed ratio–C]≥the predetermined value at step S10, the pressure difference command is shifted from the constant pressure difference command by the initial pressure difference to a pressure difference command having an increasing inclination gradient (first increase gradient θ1), at step S11. The pressure difference pressure increase is started by a ramp control. The process proceeds to step S12.

In this case, the judgment of T≥T1 at step S6 represents the satisfaction of the ramp start condition at the vehicle start at which the LU pressure difference command is switched from the initial pressure difference to the ramp pressure difference. The judgment of [the speed ratio–C]≥the predetermined value at step S10 represents the satisfaction of the ramp start condition at the reacceleration at which the LU pressure difference command is switched from the initial pressure difference to the ramp pressure difference.

Subsequently to the start of the pressure difference increase by the ramp control at step S11, or the judgment of the clutch slip amount>a predetermined to value at step S15, a turbine rotation speed variation amount by which the turbine rotation speed Nt is varied to the increase side is greater than a judgment threshold value at step S12. In case of YES (the turbine rotation speed variation amount>the judgment threshold value), the process proceeds to step S13. In case of NO (the turbine rotation speed variation amount-≤the judgment threshold value), the process proceeds to step S14.

In this case, "the turbine rotation speed variation amount" is calculated by a formula of [a target turbine rotation speed Nt(n) at this time–a target turbine rotation speed Nt(n−1) at the previous time]. "The judgment threshold value" is set to a turbine rotation speed variation amount in a region in which the engine speed Ne is started to be converged to the turbine rotation speed Nt by the increase of the LU capacity in a section from the timing at which the LU capacity is increased from zero, to the LU engagement. Specifically, "the judgment threshold value" is set, for example, at the respective accelerator opening degrees APO, by a point of intersection of the clutch transmission torque characteristic and the converter transmission torque characteristic in FIG. 13, that is, by an experiment value of the turbine rotation speed variation amount by which the clutch transmission torque $T_{LU}$ sharing the engine torque Te reaches the converter transmission torque πNe².

Subsequently to the judgment of the turbine rotation speed variation amount>the judgment threshold value at step S12, the pressure difference increase by the first increase gradient θ1 which is the ramp pressure difference is continued at step S13. The process proceeds step S15.

In this case, "the increase gradient of the pressure difference increase" is a parameter for determining decrease manner of the engine speed during the slip engagement of the lockup clutch 3. "The first increase gradient θ1" is set to a value larger as the accelerator opening degree APO is higher based on the requirements of the engine speed decrease, lagging feeling, and the engagement shock.

Subsequently to the judgment of the turbine rotation speed variation amount≤the judgment threshold value at step S12, the pressure difference increase is switched to a second increase gradient θ2 (<θ1) obtained by decreasing the pressure difference increase amount by the first increase gradient θ1 at step S14. The process proceeds to step S15.

In this case, "the second increase gradient θ2" is set so that an inclination angle of "the second increase gradient θ2" is to be greater as the accelerator opening degree APO is greater, so as to maintain a relationship in which "the second increase gradient θ2" is lower than the first increase gradient θ1. That is, at step S13 and step S14, the first increase gradient θ1 and the second increase gradient θ2 are set at each accelerator opening degree. The first increase gradient θ1 and the second increase gradient θ2 which are determined by the accelerator opening degree APO at that time are used.

Subsequently to the pressure difference increase continuation at step S13, or the pressure difference increase amount decrease at step S14, it is judged whether or not the clutch slip amount of the lockup clutch 3 becomes equal to or smaller than the predetermined value at step S15. In case of YES (the clutch slip amount≤the predetermined value), the process proceeds to step S16. In case of NO (the clutch slip amount>the predetermined value), the process proceeds to step S12.

In this case, "the clutch slip amount" is calculated by using a formula of (the engine speed Ne–the turbine rotation speed Nt). "The predetermined value" is a judgment threshold value for judging no slip rotation speed. For example, "the predetermined value" is set to about 10 rpm.

Subsequently to the judgment of the clutch slip amount-≤the predetermined value at step S15, the lockup clutch 3 is engaged by a control to maximize the LU capacity at step S16. The process proceeds to the end.

In this case, in "the control to maximize the LU capacity", a feedforward control (FF control) is performed so that the LU pressure difference command is stepwisely increased to a maximum value, so as to fully engage the lockup clutch 3.

Next, operations are explained.

The operations in the first embodiment are explained about "lockup control process operation", "lockup control operation at vehicle start", "lockup control operation at reacceleration", "ramp control operation at vehicle start", and "characteristic operation in lockup control".

[Lockup Control Process Operation]

Hereinafter, the lockup control process operation is explained with reference to a flowchart shown in FIG. 4.

At the vehicle start, when the accelerator depression operation is performed subsequently to the brake foot release operation from the vehicle stop state in the brake ON and accelerator OFF state, the process proceeds along step S1→step S2→step S3 in the flowchart of FIG. 4. At step S3, it is judged whether or not the driving point (VSP, APO) at that time is in the LU region at the vehicle start. While it is judged that the driving point is out of the LU region, the process repeats the judgment of step S3.

At step S3, when the driving point (VSP, APO) is moved across the LU start vehicle speed line in "the vehicle start slip control" at the vehicle start, the process proceeds from step S3 along step S4→step S5→step S6. WhileT<T1 is judged at step S6, the process repeats the flow of step S5→step S6. That is, the initial pressure difference (=the 0 point pressure difference+the pressure difference α) at the vehicle start is calculated at step S4. At step S5, the LU pressure difference command by the initial pressure difference at the vehicle start which is calculated at step S4 is outputted. The initial pressure difference at the vehicle start is maintained until the waiting time period condition (T≥T1) by the timer at step S6 is satisfied. Then, when the waiting time period condition by the timer at step S6 is satisfied, the common ramp control at the vehicle start and at the reacceleration.

On the other hand, when the accelerator depression operation is performed at the reacceleration from the coast deceleration state by the accelerator-off, the process proceeds along step S1→step S2→step S7 in the flowchart of FIG. 4. At step S7, it is judged whether or not the driving point (VSP, APO) at that time is in the LU region at the reacceleration. When the driving point (VSP, APO) is in the LU region, the process proceeds to step S8. When it is judged that the driving point (VSP, APO) is out of the LU region, the judgment of step S7 is repeated.

When the driving point (VSP, APO) is in the LU region at step S7, or when the driving point (VSP, APO) is moved across the LU start vehicle speed line in "the normal smooth LU control" at the reacceleration, the process proceeds from step S7 along step S8→step S9→step S10. While [the speed ratio−C]<the predetermined value is judged at step S10, the process repeats the flow of step S9→step S10. That is, the initial pressure difference (=the 0 point pressure difference+ the pressure difference β) at the reacceleration is calculated at step S8. At step S9, the LU pressure difference command by the initial pressure difference at the reacceleration which is calculated at step S8 is outputted. The output of the LU pressure difference command is maintained to the initial pressure difference at the reacceleration until the speed ratio condition at step S10 ([the speed ratio−C]≥the predetermined value) is satisfied. Then, when the speed ratio condition at step S10 is satisfied, the common ramp control at the vehicle start and at the reacceleration is started.

At the vehicle start, when the waiting time period condition by the timer at step S6 is satisfied, the process proceeds from step S6 to step S11. At the reacceleration, when the speed ratio condition at step S10 satisfied, the process proceeds from step S10 to step S11. At step S11, the pressure difference command is switched from the pressure difference command by the constant initial pressure difference to the pressure difference command having the increasing inclination gradient. When the pressure difference increase by the ramp control is started, the process proceeds to step S12. At step S12, it is judged whether or not the turbine rotation speed variation amount by which the turbine rotation speed Nt is varied toward the increase side is greater than the judgment threshold value. Then, while the turbine rotation speed variation amount>the judgment threshold value is judged, the process proceeds from step S12 to step S13. At step S13, the pressure difference increase by the first increase gradient θ1 of the ramp pressure difference is continued. The process proceeds to step S15. Then, the turbine rotation speed variation amount the threshold value is satisfied, the process proceeds from step S12 to step S14. At step S14, the pressure difference increase is switched to the pressure difference increase by the second increase gradient θ2 (<θ1) which is obtained by decreasing the pressure difference increase amount by the first increase gradient θ1. The process proceeds to step S15.

While the clutch slip amount>the predetermined value is judged at step S15, the process repeats the flow of step S12→step S13→step S15, or the flow of step S12→step S14→step S15. Then, when the clutch slip amount≤the predetermined value is judged at step S15, the process proceeds from step S15 along step S16→the end. At step S16, the lockup clutch 3 is engaged by the control to maximize the LU capacity.

In this way, the ramp start conditions at the vehicle start and at the reacceleration to switch the lockup pressure difference command from the initial pressure differences to the ramp pressure difference are the timer condition (the vehicle start) and the speed ratio condition (the reacceleration). Accordingly, the ramp start conditions at the vehicle start and at the reacceleration are different from each other. However, the following points are common at the vehicle start and the reacceleration.

The LU control is immediately started in the LU region.

The initial pressure difference is set to be the pressure difference higher than the 0 point command pressure difference.

There is the initial pressure difference keeping state to maintain the initial pressure difference.

The increase gradient is set to the gradual state as the turbine rotation speed variation amount becomes smaller in the ramp control.

[Lockup Control Operation at Vehicle Start]

Figure 8:
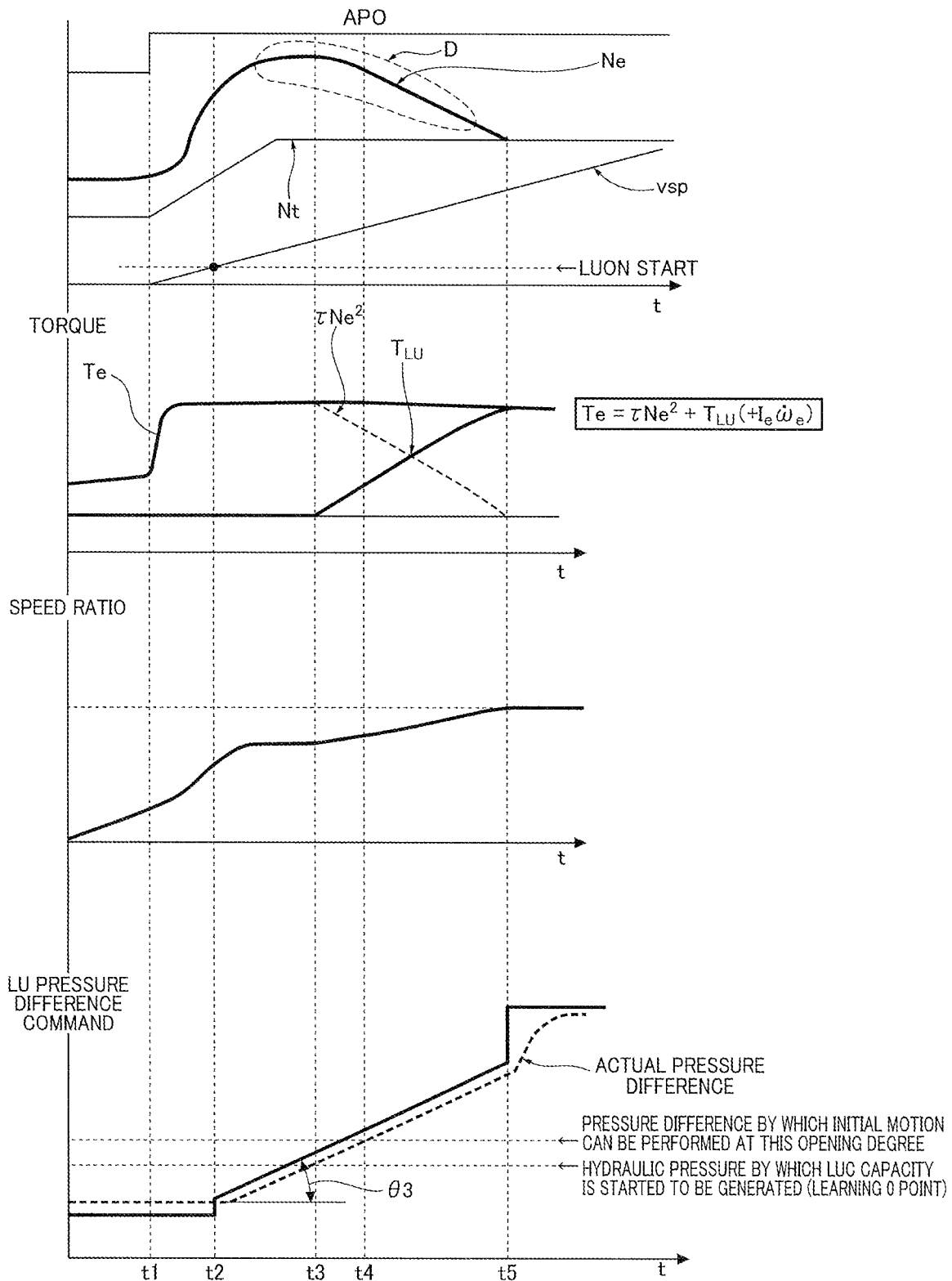
FIG. 8 is a time chart showing characteristics of an accelerator opening degree APO, an engine speed Ne, a turbine rotation speed Nt, a vehicle speed VSP, an engine torque Te (a converter transmission torque $TNe^2$, and a clutch transmission torque $T_{LU}$), a speed ratio, and an LU pressure difference command at a shift from the disengagement state of the lockup clutch to the engagement state at the vehicle start in a comparative example.

The following control operation is a comparative example. At the vehicle start by the accelerator depression operation, when the vehicle speed VSP enters the LU region, the LU control by the initial pressure difference (=the lower limit pressure) is started. Then, the control is immediately shifted from the initial pressure difference to the ramp control by the third increase gradient θ3 to perform the LU engagement. Hereinafter, the lockup control operation at the vehicle start in the comparative example is explained with reference to a time chart shown in FIG. 8.

When the accelerator pedal depression operation is performed at time t1 for the vehicle start, the engine torque Te is increased from time t1, and the engine speed Ne is increased toward the lockup control start time t2. The turbine rotation speed Nt in the vehicle start initiation region after time t1 is increased in accordance with the increase of the vehicle speed VSP.

When the vehicle speed VSP is moved across the LU start vehicle speed line in "the vehicle start slip control" at time t2, the lockup control is started. In this lockup control, the lockup pressure difference command is increased to the initial pressure difference by the lower limit pressure. Then, the pressure by the ramp pressure difference by the third increase gradient θ3 is immediately increased. From time t2, the actual pressure difference (a broken line characteristic of the LU pressure difference command) which has a hydraulic pressure response delay with respect to the lockup pressure difference command is gradually increased. At time t3, the hydraulic pressure becomes the hydraulic pressure by which the LU capacity is started to be generated from zero. Accordingly, during time t2 to time t3 during which the LU capacity is not generated, there is no engagement load of the lockup clutch, so that the engine rotation speed Ne is increased (raced) to the engine speed region higher than that of time t2.

When the hydraulic pressure becomes the hydraulic pressure by which the LU capacity is started to be generated at time t3, the converter transmission torque $TNe^2$ is decreased in accordance with the increase of the clutch transmission torque $T_{LU}$. In this way, in the sharing ratio of the engine torque Te, the sharing ratio of the clutch transmission torque $T_{LU}$ is increased as the time is elapsed. Then, when the actual pressure difference of the lockup clutch becomes the pressure difference by which the initial motion can be performed at time t4, the engine speed Ne is decreased toward time t5. Besides, the engine torque Te is shared by the converter transmission torque $TNe^2$ amount, the clutch transmission torque $T_{LU}$ amount, and the inertia torque $I_e \cdot d\omega_e$ amount. However, the inertia torque amount is omitted in the following explanation.

At time t5, the rotation speed difference (=the clutch slip amount) between the engine rotation speed Ne and the turbine rotation speed Nt is converged so that the engine rotation speed Ne and the turbine rotation speed Nt substantially correspond to each other. When the engine torque Te is shared by the clutch transmission torque TLU, the lockup clutch is engaged.

In this way, in the comparative example, the initial pressure difference is set to the lower limit pressure. Accordingly, even when the lockup control is started at step t2, the increase of the engine speed Ne is allowed from time t2 to time t3 at which the LU capacity is started to be generated. Consequently, the increase (the racing) of the engine speed Ne is generated as shown in the engine speed characteristic surrounded by an arrow D of FIG. 8.

Moreover, the increase gradient in the ramp control is set to the third increase gradient θ3 so that the hydraulic pressure rapidly becomes the hydraulic pressure by which is the LU capacity is started to be generated. Accordingly, the decrease gradient of the engine speed Ne toward the turbine rotation speed Nt becomes large. Consequently, the engagement shock is generated in the region of time t5.

On the other hand, the following operations are performed in the first embodiment. When the vehicle speed VSP enters the LU region at the vehicle start by the accelerator depression operation, the LU control by the initial pressure difference (=the 0 point pressure difference+the pressure difference α) is started. The initial pressure difference is maintained. Then, the control is shifted to the ramp control by the first increase gradient θ1 (<θ3) to perform the LU engagement. Hereinafter, the lockup control operations at the vehicle start in the first embodiment are explained with reference to a time chart of FIG. 9.

When the accelerator pedal depression operation is performed at time t1 for the vehicle start, the engine torque Te is increased from time t1, and the engine speed Ne is increased toward the lockup control start time t2. The turbine rotation speed Nt in the vehicle start initiation region after time t1 is increased in accordance with the increase of the vehicle speed VSP.

When the vehicle speed VSP is moved across the LU start vehicle speed line in "the vehicle start slip control" at time t2, the lockup control is started. In this lockup control, the lockup pressure difference command is increased to the initial pressure difference (=the 0 point pressure difference+ the pressure difference α). Then, the initial pressure difference is maintained. From time t2, the actual pressure difference (a broken line characteristic of the LU pressure difference command) which has a hydraulic pressure response delay with respect to the lockup pressure difference command is increased. At time t3, the hydraulic pressure becomes the hydraulic pressure by which the LU capacity is started to be generated.

From time t3 at which the LU capacity is started to be generated, the converter transmission torque $TNe^2$ is decreased in accordance with the increase of the clutch transmission torque $T_{LU}$. In this way, in the sharing ratio of the engine torque Te, the sharing ratio of the clutch transmission torque $T_{LU}$ is increased as the time is elapsed. Then, when the elapsed time period from time t2 becomes the setting time period by the first timer value T1 at time t4, the actual pressure difference of the lockup clutch 3 becomes the pressure difference by which the initial motion can be performed. The pressure is increased by the ramp pressure difference by the first increase gradient θ1 (<θ3) from time t4.

Accordingly, the engine speed Ne is started to be decreased from time t4 at which the pressure difference is switched from the initial pressure difference to the ramp pressure difference. At time t5, the rotation speed difference (=the clutch slip amount) between the engine rotation speed Ne and the turbine rotation speed Nt is to converged so that the engine rotation speed Ne and the turbine rotation speed Nt substantially correspond to each other. When the engine torque Te is shared by the clutch transmission torque $T_{LU}$, the lockup clutch 3 is engaged.

Figure 9:
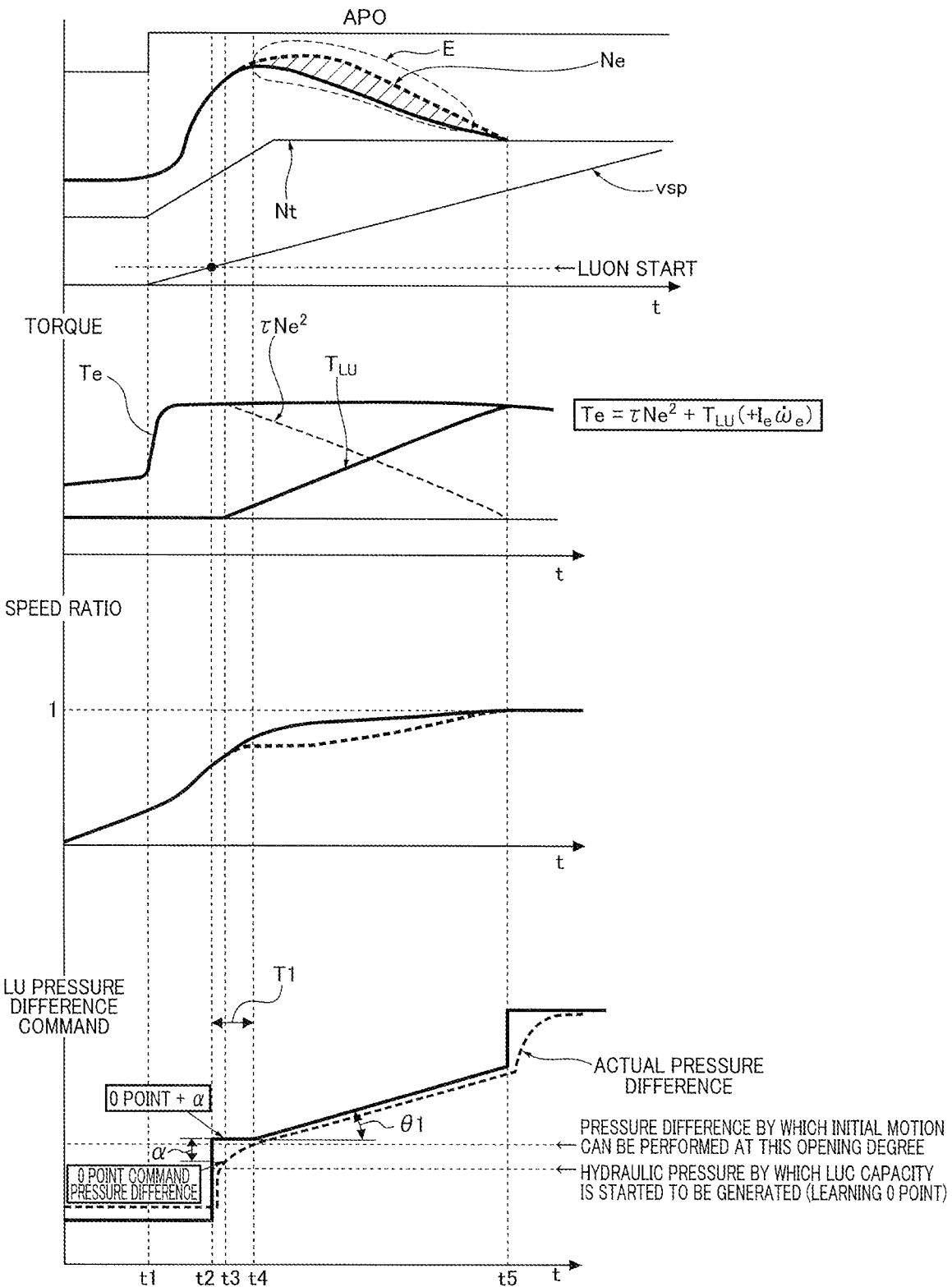
FIG. 9 is a time chart showing characteristics of an accelerator opening degree APO, an engine speed Ne, a turbine rotation speed Nt, a vehicle speed VSP, an engine torque Te (a converter transmission torque $TNe^2$, and a clutch transmission torque $T_{LU}$), a speed ratio, and an LU pressure difference command at a shift from the disengagement state of the lockup clutch to the engagement state at a vehicle start in the first embodiment.

In this way, in the first embodiment, the constant initial pressure difference is set to be higher than that of the comparative example. Accordingly, when the lockup control is started at time t2, the hydraulic pressure becomes the hydraulic pressure by which the LU capacity is started to be generated at time t3 immediately after time t2. With this, it is possible to suppress the increase of the engine speed Ne thereafter. Consequently, it is possible to suppress the increase (the racing) of the engine speed Ne, as shown by the engine speed characteristics surrounded by an arrow E of FIG. 9. Besides, a hatching part of the engine speed characteristic in FIG. 9 is an increase (racing) suppression effect amount of the engine speed Ne, with respect to the comparative example.

Moreover, the increase gradient of the ramp control is set to the first increase gradient θ1 by which the ramp pressure difference is increased by the gradient gentler than the third increase gradient θ3. Accordingly, the decrease gradient of the engine speed Ne toward the turbine rotation speed Nt becomes small. With this, it is possible to suppress the engagement shock at time t5. At this time, the initial pressure difference is set to a value higher than that of the comparative example. Therefore, it is possible to suppress from elongating the time period necessary for the shift to the full engagement of the lockup clutch 3, even when the increase gradient of the ramp pressure difference is small.

[Lockup Control Operation at Reacceleration]

Figure 10:
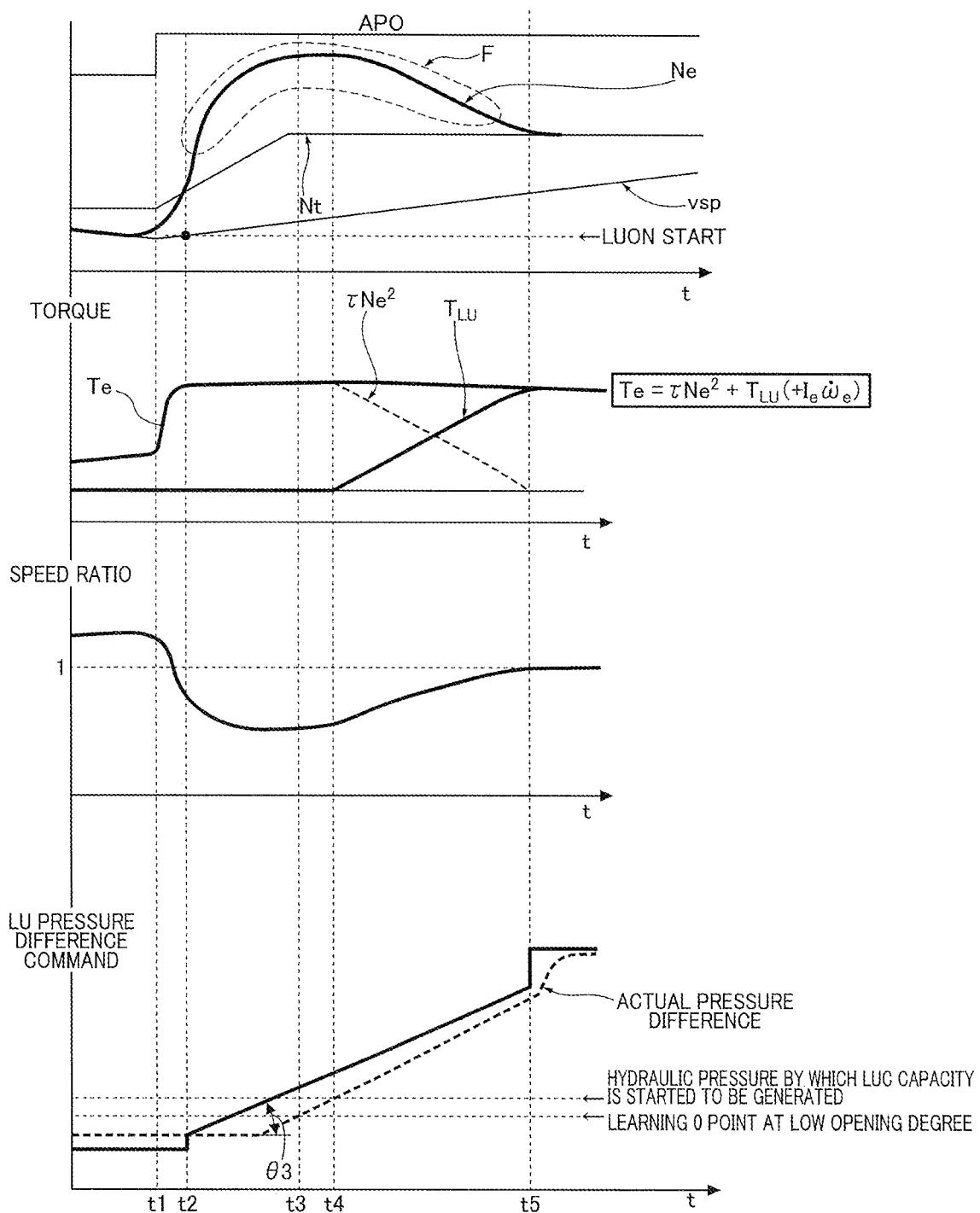
FIG. 10 is a time chart showing characteristics of an accelerator opening degree APO, an engine speed Ne, a turbine rotation speed Nt, a vehicle speed VSP, an engine torque Te (a converter transmission torque $TNe^2$, and a clutch transmission torque $T_{LU}$), a speed ratio, and an LU pressure difference command at a shift from the disengagement state of the lockup clutch to the engagement state at a reacceleration in a comparative example.

The following operations are lockup control operations at the reacceleration in the comparative example. When the vehicle speed VSP enters the LU region at the reacceleration by the accelerator depression operation from the coast deceleration traveling, the LU control by the initial pressure difference (=the lower limit pressure) is started. The control is immediately shifted from the initial pressure difference to the ramp control by the third increase gradient θ3 to perform the LU engagement. Hereinafter, the lockup control operations at the reacceleration in the comparative example are explained with reference to the time chart shown in FIG. 10.

When the accelerator pedal depression operation is performed at time t1 for the reacceleration, the engine torque Te is increased from time t1, and the engine speed Ne is increased toward the lockup control start time t2. The turbine rotation speed Nt in the reacceleration region after time t1 is increased in accordance with the increase of the vehicle speed VSP.

When the vehicle speed VSP is moved across the LU start vehicle speed line in "the normal smooth LU control" at time t2, the lockup control is started. In this lockup control, the lockup pressure difference command is increased to the initial pressure difference by the lower limit pressure. Then, the pressure by the ramp pressure difference by the third increase gradient θ3 is immediately increased. From time t2, the actual pressure difference (a broken line characteristic of the LU pressure difference command) which has a hydraulic pressure response delay with respect to the lockup pressure difference command is gradually increased. At time t3, the actual pressure becomes 0 point at the learning at the low opening degree. At time t4, the hydraulic pressure becomes the hydraulic pressure by which the LU capacity is started to be generated. Accordingly, during time t2 to time t3 during which the LU capacity is not generated, there is no engagement load of the lockup clutch, so that the engine rotation speed Ne is increased (raced) to the engine speed region higher than that of time t2.

When the hydraulic pressure becomes the hydraulic pressure by which the LU capacity is started to be generated at time t4, the converter transmission torque $TNe^2$ is decreased in accordance with the increase of the clutch transmission torque $T_{LU}$. In this way, in the sharing ratio of the engine torque Te, the sharing ratio of the clutch transmission torque $T_{LU}$ is increased as the time is elapsed. Then, from time t4, the engine speed Ne is decreased toward time t5.

At time t5, the rotation speed difference (=the clutch slip amount) between the engine rotation speed Ne and the turbine rotation speed Nt is converged so that the engine rotation speed Ne and the turbine rotation speed Nt substantially correspond to each other. When the engine torque Te is shared by the clutch transmission torque TLU, the lockup clutch is engaged.

In this way, in the comparative example, the initial pressure difference is set to the lower limit pressure. Accordingly, even when the lockup control is started at step t2, the increase of the engine speed Ne is allowed from time t2 to time t3 at which the LU capacity is started to be generated. Consequently, the increase (the racing) of the engine speed Ne is generated as shown in the engine speed characteristic surrounded by an arrow F of FIG. 10.

Moreover, the increase gradient in the ramp control is set to the third increase gradient θ3 so that the hydraulic pressure rapidly becomes the hydraulic pressure by which the LU capacity is started to be generated. Accordingly, the decrease gradient of the engine speed Ne toward the turbine rotation speed Nt becomes large. Consequently, the engagement shock is generated in the region of time t5.

On the other hand, the following operations are performed in the first embodiment. When the vehicle speed VSP is in the LU region at reacceleration by the accelerator depression operation from the coast deceleration traveling, the LU control by the initial pressure difference (=the 0 point pressure difference+the pressure difference β) immediately is started. The initial pressure difference is maintained. Then, the control is shifted to the ramp control by the first increase gradient θ1 (<θ3) to perform the LU engagement. Hereinafter, the lockup control operations at the reacceleration in the first embodiment are explained with reference to a time chart of FIG. 11.

When the accelerator pedal depression operation is performed at time t1 for the vehicle start, the lockup control is started when the vehicle speed VSP is in the LU region at time t1. In this lockup control, the lockup pressure difference command is increased to the initial pressure difference (=the 0 point pressure difference+the pressure difference β). Then, the initial pressure difference is maintained. From time t1, the actual pressure difference (a broken line characteristic of the LU pressure difference command) which has a hydraulic pressure response delay with respect to the lockup pressure difference command is increased. At time t2, the hydraulic pressure becomes the hydraulic pressure by which the LU capacity is started to be generated.

From time t2 at which the LU capacity is started to be generated, the converter transmission torque $TNe^2$ is decreased in accordance with the increase of the clutch transmission torque $T_{LU}$. In this way, in the sharing ratio of the engine torque Te, the sharing ratio of the clutch transmission torque $T_{LU}$ is increased as the time is elapsed. Accordingly, the suppression of the increase (racing) of the engine rotation speed Ne is started from time t2 to time t3. Then, when the inflection point of the speed ratio e (e=0.6~0.7) is sensed at time t3, the pressure is increased by the ramp pressure difference by the first increase gradient θ1 (<θ3).

Accordingly, the engine speed Ne is started to be decreased from time t4 at which the actual pressure difference of the lockup clutch 3 becomes the pressure difference at which the initial motion can be performed. At time t5, the rotation speed difference (=the clutch slip amount) between the engine rotation speed Ne and the turbine rotation speed Nt is converged so that the engine rotation speed Ne and the turbine rotation speed Nt substantially correspond to each other. When the engine torque Te is shared by the clutch transmission torque $T_{LU}$, the lockup clutch 3 is engaged.

Figure 11:
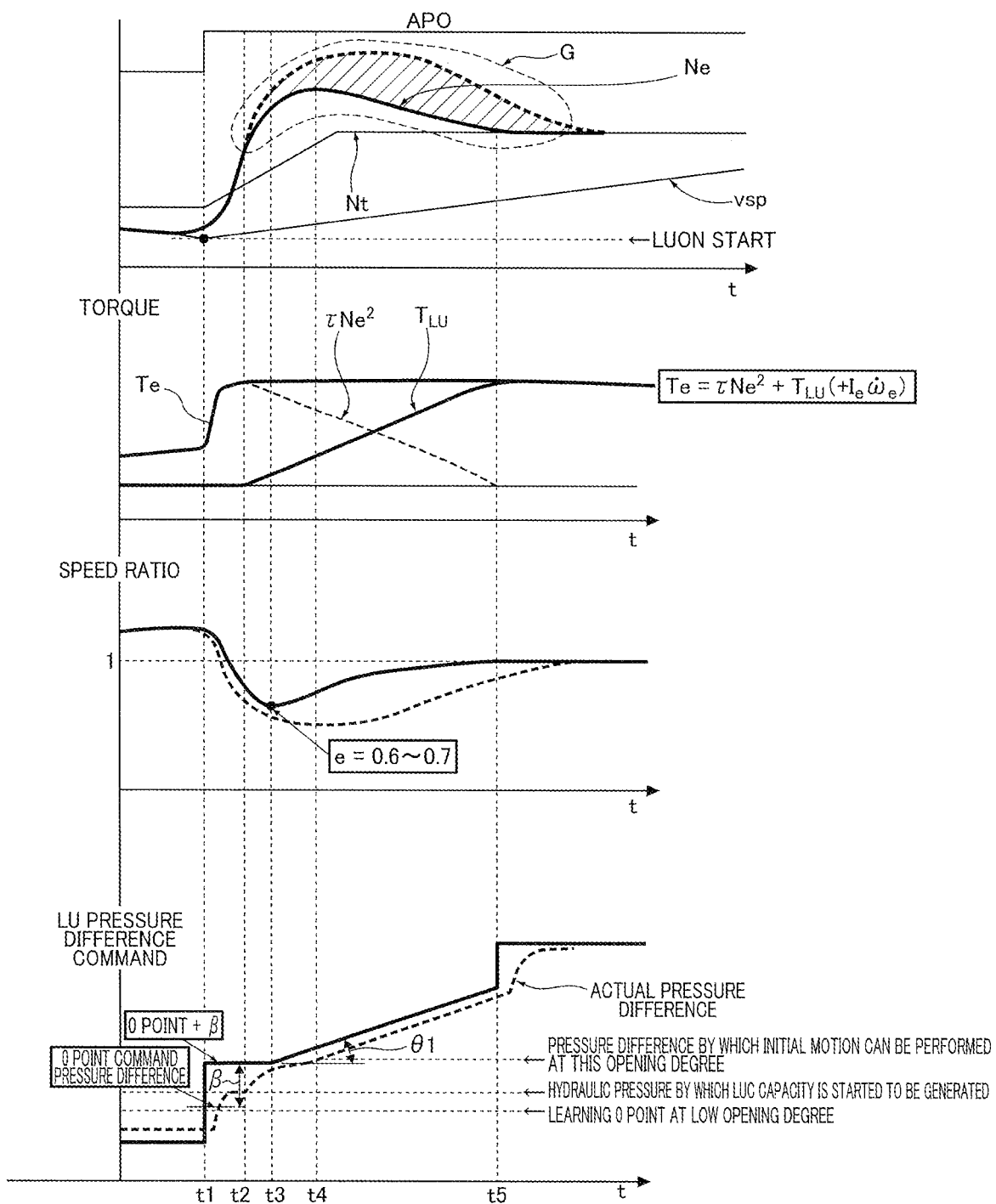
FIG. 11 is a time chart showing characteristics of an accelerator opening degree APO, an engine speed Ne, a turbine rotation speed Nt, a vehicle speed VSP, an engine torque Te (a converter transmission torque $TNe^2$, and a clutch transmission torque $T_{LU}$), a speed ratio, and an LU pressure difference command at a shift from the disengagement state of the lockup clutch to the engagement state at a reacceleration in the first embodiment.

In this way, in the first embodiment, the constant initial pressure difference is set to be higher than that of the comparative example. Accordingly, when the lockup control is started at time t1, the hydraulic pressure becomes the hydraulic pressure by which the LU capacity is started to be generated, at time t2 immediately after time t1. With this, it is possible to suppress the increase of the engine speed Ne thereafter. Consequently, it is possible to suppress the increase (the racing) of the engine speed Ne, as shown by the engine speed characteristics surrounded by an arrow G of FIG. 11. Besides, a hatching part of the engine speed characteristic in FIG. 11 is an increase (racing) suppression effect amount of the engine speed Ne, with respect to the comparative example.

Moreover, the increase gradient of the ramp control is set to the first increase gradient θ12 by which the ramp pressure difference is increased by the gradient gentler than the third increase gradient θ3. Accordingly, the decrease gradient of the engine speed Ne toward the turbine rotation speed Nt becomes small. With this, it is possible to suppress the engagement shock. At this time, in the first embodiment, the initial pressure difference is set to a value higher than that of the comparative example. Therefore, it is possible to suppress from elongating the time period necessary for the shift to the full engagement of the lockup clutch 3, even when the increase gradient of the ramp pressure difference is small.

Furthermore, at the reacceleration by the accelerator depression operation, the LU control is immediately started by the initial pressure difference when the vehicle speed VSP is in the LU region. Accordingly, it is possible to rapidly engage the disengaged lockup clutch 3 by the accelerator depression operation.

[Ramp Control Operation at Vehicle Start]

At the vehicle start by the accelerator depression operation, the LU control is started by the initial pressure difference (=the 0 point pressure difference+the pressure difference α) when the vehicle speed VSP enters the LU region. After the initial pressure difference is maintained, the control is shifted to the ramp control to perform the LU engagement. In this ramp control, in a comparative example, the increasing gradient is the first increase gradient θ1 irrespective of the turbine rotation speed variation amount. Hereinafter, the ramp control operations at the vehicle start in the comparative example is explained with reference to a time chart shown in FIG. 12. Besides, the operations before the time t3 are identical to those of FIG. 9. Accordingly, the explanations are omitted.

Figure 12:
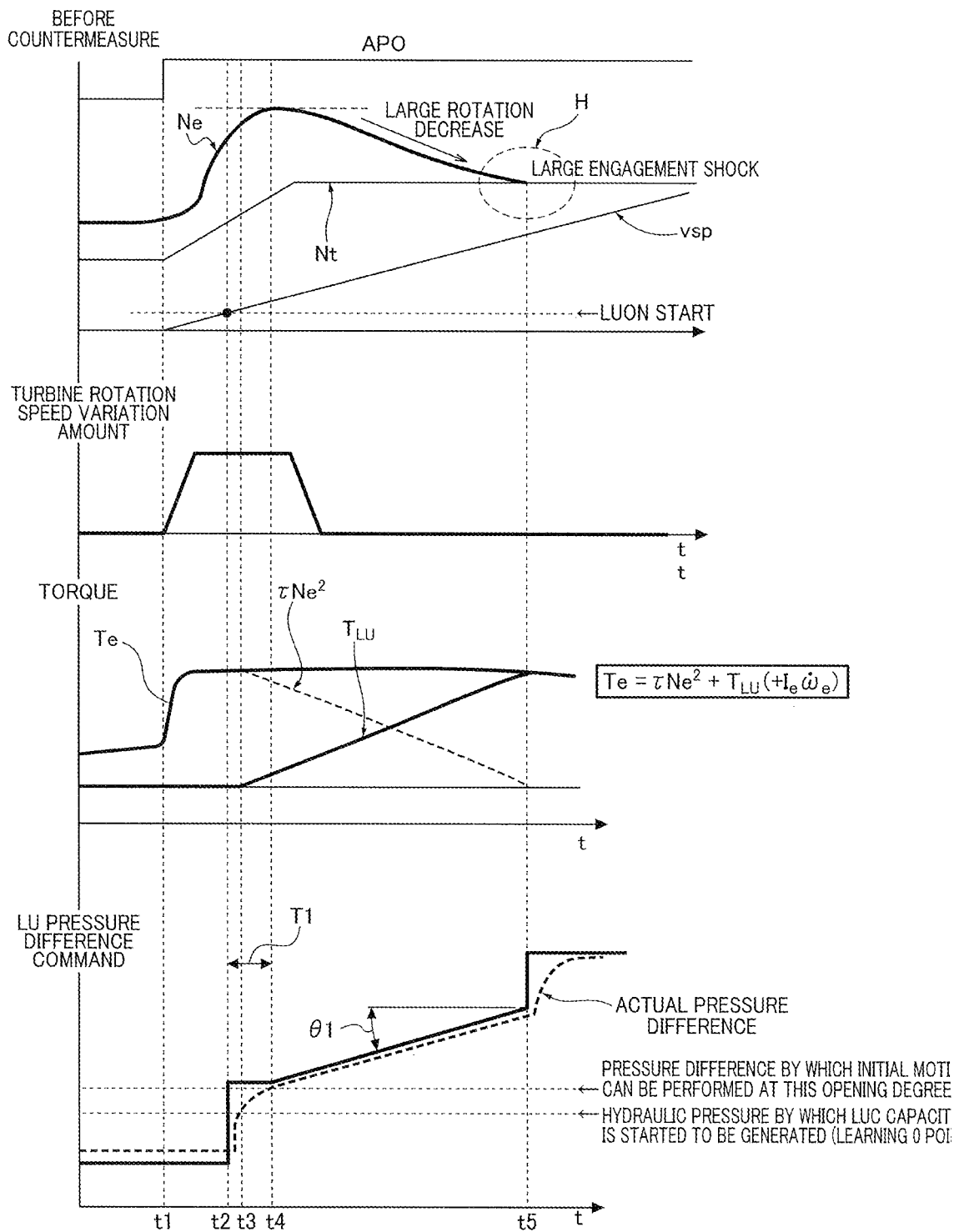
FIG. 12 is a time chart showing characteristics of an accelerator opening degree APO, an engine speed Ne, a turbine rotation speed Nt, a vehicle speed VSP, a turbine rotation speed variation amount, an engine torque Te (a converter transmission torque $TNe^2$, and a clutch transmission torque $T_{LU}$), and an LU pressure difference command when a ramp control is performed at a vehicle start in a comparative example.

At time t4 of FIG. 12, when the elapsed time period from time t2 becomes a setting time by the first timer value T1, the actual pressure difference of the lockup clutch 3 becomes the pressure by which the initial motion can be performed. The pressure is increased from time t4 by the ramp pressure difference by the first increase gradient θ1 (>θ2).

In this way, in the comparative example, the increase gradient of the ramp control from time t4 is set to the first increase gradient θ1, irrespective of the variation amount of the turbine rotation speed Nt. Accordingly, in a case where the LU capacity of the lockup clutch 3 is increased when the variation amount of the turbine rotation speed Nt is small, that is, when the increase amount of the engine turbine rotation speed Nt is small relative to the increase amount of the engine speed Ne, the decrease gradient (the rotation decrease) of the engine speed Ne toward the turbine rotation speed Nt becomes large. Therefore, the engagement shock is generated in an engagement region surrounded by an arrow H of FIG. 12.

On the other hand, at the vehicle start by the accelerator depression operation, the LU control is started by the initial pressure difference (=the 0 point pressure difference+the pressure difference α) when the vehicle speed VSP enters the LU region. After the initial pressure difference is maintained, the control is shifted to the ramp control to perform the LU engagement. In this ramp control, in the first embodiment, the increase gradient is the first increase gradient θ1 while the turbine rotation speed variation amount exceeds the judgment threshold value. The increase gradient is the second increase gradient θ2 (<θ1) when the turbine rotation speed variation amount becomes equal to or smaller than the judgment threshold value. Hereinafter, the lockup control operations at the vehicle start in the first embodiment is explained with reference to the time chart shown in FIG. 13. Besides, the operations before the time t3 are identical to those of FIG. 9. Accordingly, the explanations are omitted.

Figure 13:
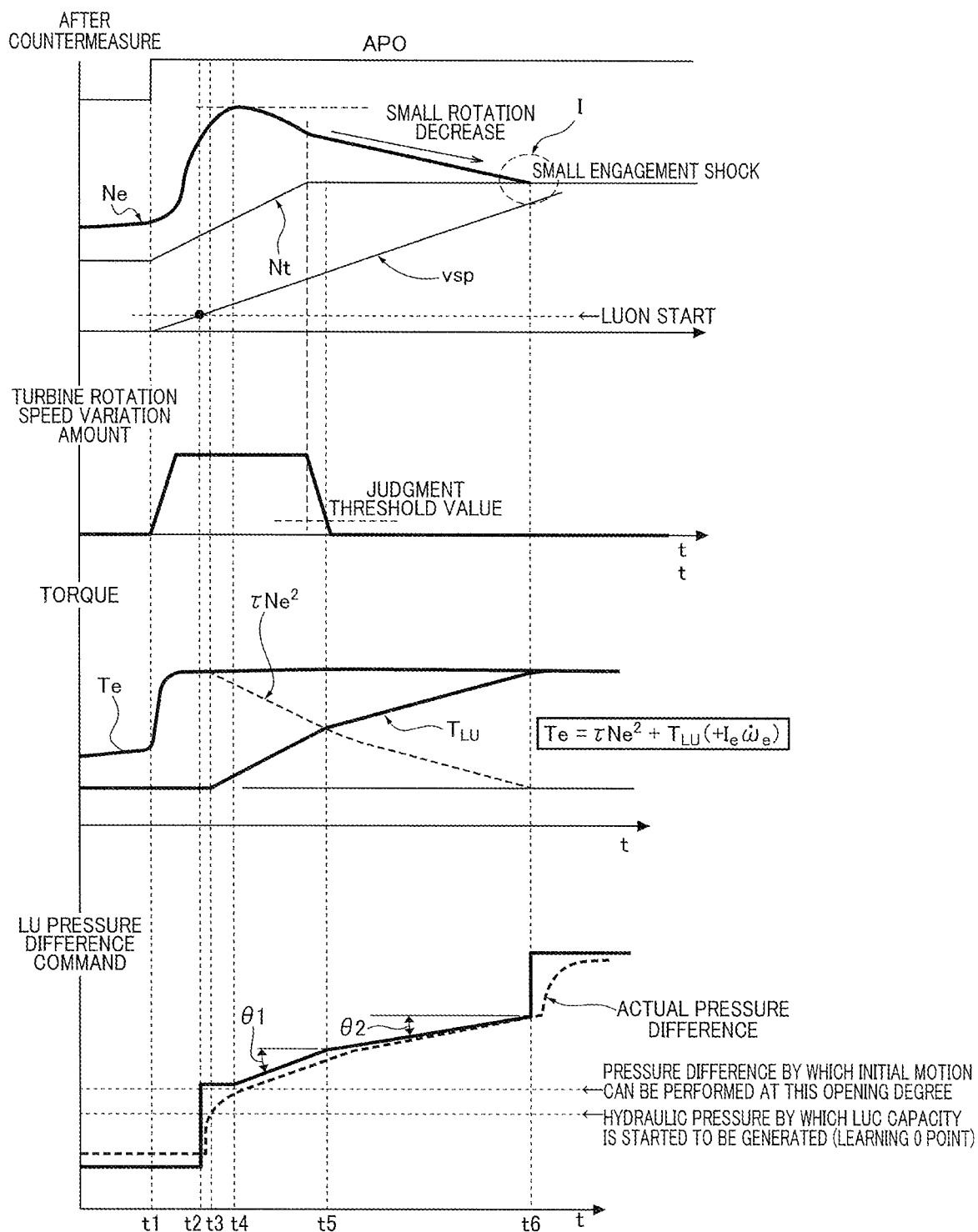
FIG. 13 is a time chart showing characteristics of an accelerator opening degree APO, an engine speed Ne, a turbine rotation speed Nt, a vehicle speed VSP, a turbine rotation speed variation amount, an engine torque Te (a converter transmission torque $TNe^2$, and a clutch transmission torque $T_{LU}$), and an LU pressure difference command when a ramp control is performed at a vehicle start in the first embodiment.

When the elapsed time period from time t2 becomes a setting time by the first timer value T1 at time t4 of FIG. 13, the actual pressure difference of the lockup clutch 3 becomes the pressure difference by which the initial motion can be performed. The pressure is increased by the ramp pressure difference from time t4. In this case, the gradient is set to the first increase gradient θ1 from time t4 to time t5, since the turbine rotation speed variation amount exceeds the judgment threshold value. However, at time t5 at which the turbine rotation speed variation amount becomes equal to or smaller than the judgment threshold value, the increase gradient is switched from the first increase gradient θ1 to the second increase gradient θ2 (<θ1). The second increase gradient θ2 is maintained until the LU engagement time t6.

In this way, in the first embodiment, the increase gradient of the ramp control is set to the first increase gradient θ1 when the turbine rotation speed variation amount exceeds the judgment threshold value. The increase gradient of the ramp control is set to the second increase gradient θ2 (<θ1) when the turbine rotation speed variation amount becomes equal to or greater than the judgment threshold value. Accordingly, even when the LU capacity of the lockup clutch 3 is increased in a state where the variation amount of the turbine rotation speed Nt is small, the decrease gradient (the rotation decrease) of the engine speed Ne toward the turbine rotation speed Nt becomes small. Consequently, the engagement shock is suppressed in the engagement region surrounded by an arrow I in FIG. 13. Moreover, it is possible to shorten the time period necessary for the lockup control, and to improve the engagement response, relative to a case where the increase gradient is set in the entire region to the second increase gradient θ2.

[Characteristic Operation in Lockup Control]

The ramp start timing at which the LU pressure difference command is switched from the initial pressure difference to the ramp pressure difference is determined based on the speed ratio e which is a ratio of the input and output rotation speeds of the torque converter 4.

That is, the speed ratio e of the torque converter 4 is represented by a formula of (the speed ratio e=the turbine rotation speed Nt/the engine rotation speed Ne). Accordingly, the speed ratio e of the torque converter 4 is an index (indicator) value reflecting the variation of the turbine rotation speed Nt and the variation of the engine speed Ne. In addition, when the speed ratio e of the torque converter 4 is shifted from the speed ratio e in the disengagement state of the lockup clutch 3 to the speed ratio e at which the LU capacity is started to be generated (the lockup clutch 3 starts to have the LU capacity), the speed ratio e is varied by the suppression of the increase of the engine speed Ne. Consequently, it is possible to sense the appropriate ramp start timing at which the lockup clutch 3 starts to have the LU capacity, by monitoring the variation of the speed ratio e of the torque converter. Therefore, it is possible to decrease the vehicle behavior variation due to the engagement of the lockup clutch 3 in a traveling scene in which the lockup clutch is shifted from the disengagement state to the engagement state.

In the first embodiment, when the inflection point of the speed ratio at which the speed ratio e of the torque converter 4 is shifted from the decreasing state to the increasing state is sensed at the reacceleration by the accelerator depression operation from the accelerator foot release coast deceleration in which the lockup clutch 3 is disengaged, the LU pressure difference command is shifted from the initial pressure difference to the ramp pressure difference.

That is, as shown in FIG. 7 and FIG. 11, the speed ratio e is decreased from a value which is equal to or greater than 1, during the disengagement state of the lockup clutch 3 at the reacceleration. However, at the speed ratio e (e=0.6~0.7) at which the lockup clutch 3 starts to have the LU capacity, the speed ratio e is started to be increased toward 1 since the increase of the engine speed Ne is suppressed, so that the inflection point of the speed ratio e appears.

Accordingly, it is possible to decrease the variation of the vehicle behavior due to the engagement of the lockup clutch 3, by accurately sensing the appropriate ramp start timing at the reacceleration by the accelerator depression from the coast deceleration.

In the first embodiment, after the LU pressure difference command is increased to the initial pressure difference, the initial pressure difference is maintained to the constant value until the inflection point of the speed ratio is sensed.

That is, the initial pressure difference is maintained to the constant value until the LU pressure difference command is increased by the ramp pressure difference. With this, it is possible to avoid the deviation between the LU pressure difference command and the LU actual pressure difference during the output of the initial pressure difference, and to prevent the sudden engagement at the engagement of the lockup clutch 3 in the subsequent increase of the ramp pressure difference.

Accordingly, it is possible to decrease the variation of the vehicle behavior due to the engagement of the lockup clutch 3, by maintaining the initial pressure difference to the constant value at the reacceleration by the accelerator depression from the coast deceleration.

In the first embodiment, the initial pressure difference is a value obtained by adding the pressure difference β corresponding to the clutch transmission torque $T_{LU}$ to suppress the engine rotation increase (racing) from (after) the converter state of the torque converter 4, to the 0 point pressure difference based on the meet point learning value at which the LU capacity is started to be generated.

That is, in a section in which the constant initial pressure difference is outputted, the engine speed increase (racing) suppression is started in an initial stage by starting to grasp the lockup clutch 3, and moreover by generating the clutch transmission torque $T_{LU}$. Then, the control is shifted to the next ramp control in which the clutch transmission torque $T_{LU}$ is increased, and in which the engine speed Ne is decreased.

Accordingly, in the engine vehicle, it is possible to shorten the wasted time period from the start of the LU control to the start of the suppression of the engine rotation speed increase (racing), and to orderly suppress the engine rotation increase (racing).

In the first embodiment, when the driving point (VSP, APO) is in the LU region at the reacceleration by the accelerator depression operation from the coast deceleration traveling, the LU pressure difference command is immediately increased to the initial pressure difference.

For example, when the LU control is prohibited at the reacceleration from (after) the cost deceleration traveling, during a predetermined time period (for example, 1 second) from the accelerator depression operation, so as to avoid the engagement shock, the prohibition time period becomes a waiting time period until the LU control start. Accordingly, the engine speed increase (racing) is promoted.

On the other hand, when the driving point (VSP, APO) at the accelerator depression operation is in the LU region, the LU pressure difference command is immediately increased to the initial pressure difference, so that the waiting time period of the LU control start is omitted.

Accordingly, the waiting time period from the accelerator depression operation to the LU control start is omitted at the reacceleration under a condition in which the driving point (VSP, APO) is in the LU region. Moreover, it is possible to suppress the engine rotation increase (racing) at the high response.

Next, effects are explained.

In the lockup control device for the engine vehicle, the following effects are obtained.

(1) A lockup control device for a vehicle (engine vehicle) includes:

a torque converter 4 which is disposed between a driving source (engine 1) and a transmission (continuously variable transmission 6), and which includes a lockup clutch 3, and a lockup control means (CVT control unit 12) configured to increase a lockup pressure difference command (LU pressure difference command) to an initial pressure difference when a lockup engagement condition is satisfied in a disengagement state of the lockup clutch, and then to increase the lockup pressure difference command by a ramp pressure difference by a predetermined gradient, the lockup control means (CVT control unit 12, FIG. 4) being configured to determine a ramp start condition by which the lockup pressure difference command (LU pressure difference command) is switched from the initial pressure difference to the ramp pressure difference, based on a speed ratio e which is a ratio of input and output rotation speeds of the torque converter 4.

Accordingly, in the traveling scene in which the lockup clutch 3 is shifted from the disengagement state to the engagement state, it is possible to decrease the variation of the vehicle behavior due to the engagement of the lockup clutch 3.

(2) The lockup control means (CVT control unit 12, FIG. 4) is configured to switch the lockup pressure difference command (the LU pressure difference command) from the initial pressure difference to the ramp pressure difference when the lockup control means senses a speed ratio inflection point at which the speed ratio e of the torque converter 4 is shifted from a decreasing state to an increasing state, at a reacceleration by an accelerator depression operation from an accelerator foot release coast deceleration in which the lockup clutch 3 is disengaged.

Accordingly, in addition to the effect (1), it is possible to decrease the variation of the vehicle behavior due to the engagement of the lockup clutch 3, by accurately sensing the appropriate ramp start timing at the reacceleration by the accelerator depression from the coast deceleration.

(3) The lockup control means (CVT control unit 12, FIG. 4) is configured to increase the lockup pressure difference command (the LU pressure difference command) to the initial pressure difference, and then to maintain the initial pressure difference to a constant value until the lockup control means senses the speed ratio inflection point.

Accordingly, in addition to the effect (2), it is possible to decrease the variation of the vehicle behavior due to the engagement of the lockup clutch 3 by maintaining the initial pressure difference to the constant value at the reacceleration by the accelerator depression from the coast deceleration.

(4) The lockup control device includes an engine 1 which is the driving source; and the lockup control means (CVT control unit 12, FIG. 4) is configured to set, to the initial pressure difference, a value obtained by a pressure difference β corresponding to a clutch transmission torque $T_{LU}$ for suppressing a racing of the engine speed from a converter state of the torque converter 4, to a 0 point pressure difference based on a meet point learning value at which the lockup clutch starts to have a lockup capacity (LU capacity).

Accordingly, in addition to the effects (1) to (3), in the engine vehicle, it is possible to shorten the wasted time period from the start of the lockup control to the engine speed increase (racing) suppression start, and to orderly suppress the engine rotation speed increase (racing).

(5) The lockup control means (CVT control unit 12, FIG. 4) is configured to immediately increase the lockup pressure difference command (LU pressure difference command) to the initial pressure difference when a driving point (VSP, APO) at the accelerator depression operation is in a lockup region (LU region) at a reacceleration by the accelerator depression operation from a coast traveling state.

Accordingly, in addition to the effect (4), it is possible to omit the wasted time period from the accelerator depression operation to the lockup control start under a condition in which the driving point (VSP, APO) is in the lockup region (the LU region) at the reacceleration, to suppress the engine rotation speed increase (racing) at the high response.

Hereinabove, the lockup control device for the vehicle according to the first embodiment of the present invention is explained. However, the concrete configuration is not limited to this first embodiment. Variations, additions and so on of the design are permitted as long as they are not deviated from the gist of the present invention defined in claims.

In the first embodiment, the sensing example of the ramp start timing based on the speed ratio is the sensing example of the inflection point of the speed ratio at the reacceleration when the speed ratio e is shifted from the decreasing state to the increasing state. However, the sensing example of the ramp start timing based on the speed ratio may be the sensing example of the variation point of the gradient of the speed ratio at the vehicle start at which the increasing inclination of the speed ratio of the torque converter is shifted to the decreasing side when the LU capacity is started to be generated.

In the first embodiment, when the LU pressure difference command is increased to the initial pressure difference, the initial pressure difference is maintained to the constant value while the ramp start timing is sensed. However, the LU pressure difference command may be varied while the ramp start timing is sensed.

In the first embodiment, the initial pressure difference at the reacceleration is the value obtained by adding the pressure difference β corresponding to the clutch transmission torque $T_{LU}$ for suppressing the engine speed increase (racing) from the converter state of the torque converter 4, to the 0 point pressure difference based on the meet point learning value at which the LU capacity is started to be generated. However, the initial motion pressure difference may be, for example, a value obtained by adding the pressure difference α obtained in consideration of the initial motion pressure difference from the converter state of the torque converter, to the 0 point pressure difference based on the meet point learning value at which the LU capacity is started to be generated, similarly to the vehicle start.

In the first embodiment, the LU pressure difference command is immediately increased to the initial pressure difference when the driving point (VSP, APO) at the accelerator depression operation is in the LU region at the reacceleration by the accelerator depression operation from the coast deceleration traveling. However, the LU pressure difference command may be increased to the initial pressure difference after the ramp start timing based on the speed ratio is sensed even when the driving point (VSP, APO) at the accelerator depression operation is in the LU region at the reacceleration.

In the first embodiment, the lockup control device according to the present invention is applied to the engine vehicle including the torque converter and the continuously variable transmission. However, the lockup clutch control device according to the present invention is applicable to a hybrid vehicle including an engine and a motor which are driving sources, and an electric vehicle including a motor being a driving source. Moreover, the lockup control device according to the present invention is applicable to a vehicle including a continuously variable transmission having an auxiliary transmission, and a stepwise automatic transmission. That is, the lockup control device according to the present invention is applicable to a vehicle in which the torque converter having the lockup clutch is disposed between the driving source and the transmission.

The invention claimed is:

1. A lockup control device for a vehicle comprising:
a torque converter which is disposed between a driving source and a transmission, and which includes a lockup clutch, and
a control unit configured to perform a lockup control to increase a lockup pressure difference command to an initial pressure difference when a lockup engagement condition is satisfied in a disengagement state of the lockup clutch, and then to increase the lockup pressure difference command by a ramp pressure difference by a predetermined gradient,
the control unit being configured to determine a ramp start condition by which the lockup pressure difference command is switched from the initial pressure difference to the ramp pressure difference, based on a speed ratio which is a ratio of input and output rotation speeds of the torque converter,
wherein, at a reacceleration by an accelerator depression operation from an accelerator foot release coast deceleration in which the lockup clutch is disengaged, the control unit is configured to
increase the lockup pressure difference command to the initial pressure difference,
maintain the initial pressure difference to a constant value until the control unit senses a speed ratio inflection point at which the speed ratio of the torque converter is shifted from a decreasing state to an increasing state, and
switch the lockup pressure difference command from the initial pressure difference to the ramp pressure difference when the control unit senses the speed ratio inflection point.

2. The lockup control device for the vehicle as claimed in claim 1, wherein
the lockup control device includes an engine which is the driving source; and
the control unit is configured to set, to the initial pressure difference, a value obtained by a pressure difference corresponding to a clutch transmission torque for suppressing racing of the engine speed from a converter state of the torque converter, to a 0 point pressure difference based on a meet point learning value at which the lockup clutch starts to have lockup capacity.

3. The lockup control device for the vehicle as claimed in claim 2, wherein the control unit is configured to immediately increase the lockup pressure difference command to the initial pressure difference when a driving point at the accelerator depression operation is in a lockup region at a reacceleration by the accelerator depression operation from a coast traveling state.

* * * * *